Patented Oct. 7, 1941

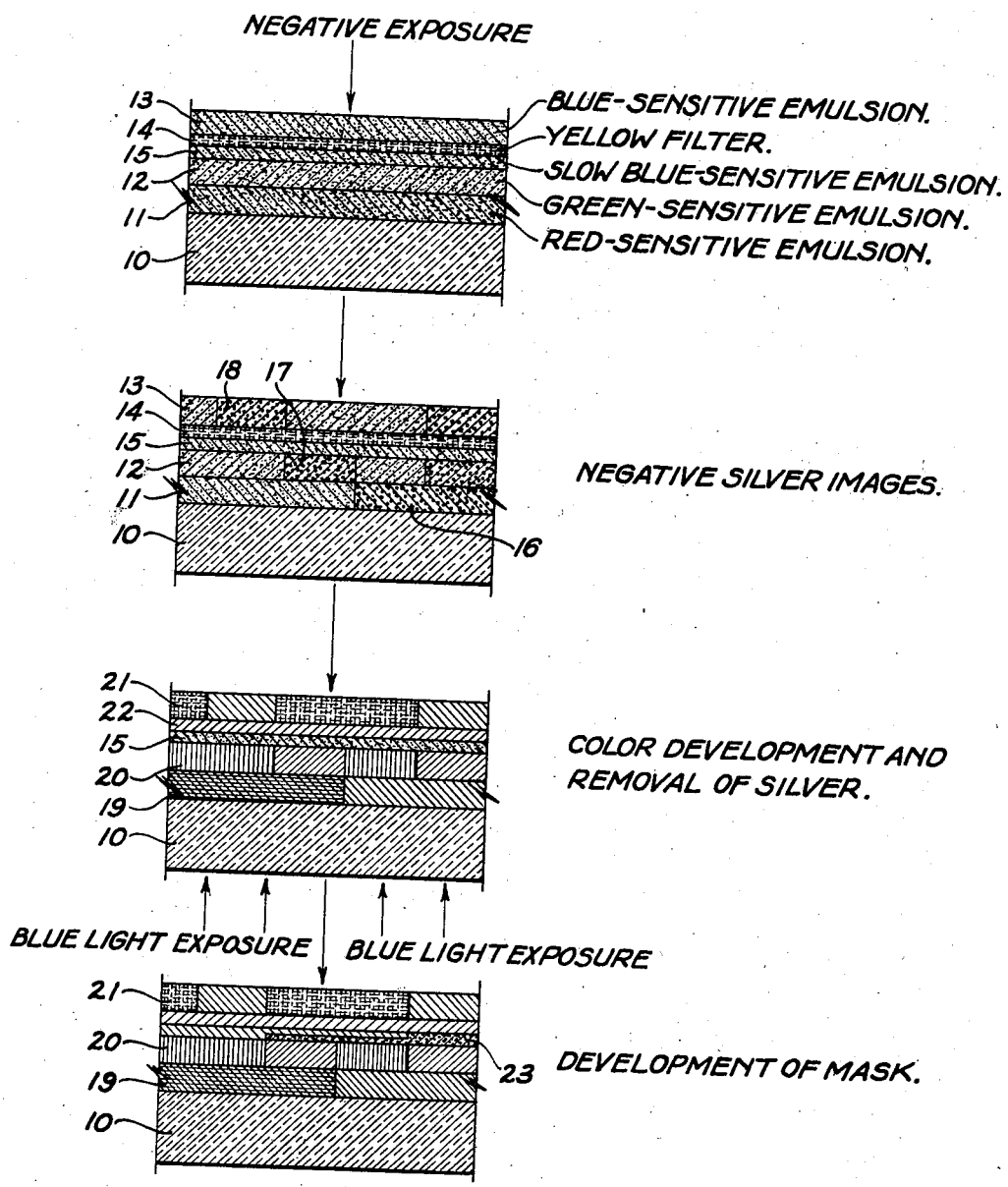

2,258,187

UNITED STATES PATENT OFFICE 2,258,187

INTEGRAL MASK FOR MULTICOLOR FILM

Leopold D. Mannes, New York, N. Y., Leopold Godowsky, Jr., Westport, Conn., and Lot S. Wilder, Rochester, N. Y., assignors to Eastman Kodak Company, Rochester, N. Y., a corporation of New Jersey Application May 15, 1941, Serial No. 393,580
In Great Britain January 15, 1940

4 Claims. (Cl. 95—2)

This invention relates to a multi-layer color film and particularly to a method of processing the same to obtain color correction in such film.

It is well known that color prints made by uncorrected method of photographic color reproduction suffer from degradation with more or less gray. This is due to the fact that some of the pigments or dyes used in the color print on the original from which it is made absorb light not only in the spectral regions which they are intended to absorb but also to some extent in other regions. According to the subtractive method of color photography, the color separation images are printed in colors complementary to the colors of the taking filters or the sensitivity of the emulsion layers. In three-color photography the primary colors are considered to be red, green and blue and the color separation images obtained from these are printed respectively in blue-green, magenta and yellow colors. If theoretically accurate dyes could be obtained, these dyes should absorb only their complementary colors. The blue-green should absorb the red region of the spectrum and transmit the blue and the green regions. Similarly, the magenta dye should absorb the green region of the spectrum and transmit the blue and the red regions, and the yellow dye should absorb the blue region and transmit the red and the green regions.

Dyes have not yet been found for use in color photography which absorb only in the proper spectral regions. The blue-green dye usually absorbs not only in the red region but also to some extent in the green and the blue regions. The magenta dye absorbs not only in the green region but also in the blue and red regions. The yellow dye, on the other hand, is usually quite efficient, absorbing very little except in the blue and violet region.

As a result of the light absorption of the blue-green dye in the blue and green regions of the spectrum, certain corrections must be applied in printing, or a lower concentration of magenta or yellow dye must be used in the print in order to maintain a balance of color in the scale of grays. By using less magenta or yellow dye in the print than would otherwise be used, the gray scale balance is maintained by the blue-greens. Greens and blues of the print are degraded with gray and, therefore, are less luminous than they should be, while the magentas, yellows and reds are lacking in saturation, that is, are diluted by white.

In the preparation of color separation negatives or positives by printing from a colored original, such as a multi-color transparency, this degradation of colors may be overcome by the use of masks, that is, thin positives in the case of color separation negatives, which are registered with the color separation negative in making the print. When printing from a multi-color image in photographic film onto a similar multi-layer film, it is, of course, difficult to use separate masks for the different color separation records since they are most easily printed simultaneously onto the printing material. If a single mask is used, the registration difficulties are considerable and in the case of small sized film, such as motion picture film, render this method of color correction impracticable.

We have discovered a method of color correction which is suitable for printing a multi-color image on multi-layer film onto a similar material and is also useful in printing onto separate emulsion layers for making color separation records. It is of special use in duplicating natural color transparencies or natural color film.

According to this method an additional emulsion layer is coated as a part of multi-layer film for the purpose of carrying a masking image. The additional layer may be placed anywhere between the yellow filter layer (which is usually between the top and middle emulsion layers) and the support, but it is preferably coated just under the yellow filter layer. The masking layer should be thin and consist of a fine grain, contrasty, slow, not easily fogged emulsion, and should not be color sensitized.

The accompanying drawing is a series of sectional views showing the steps in the method of preparing a printing element according to our invention.

The usual type of multi-layer film consists of a support having coated thereon three emulsion layers effectively sensitive, respectively, to the red, green, and blue regions of the spectrum. Since the emulsions sensitive to the red and green spectral regions are also blue-sensitive, a yellow filter layer is usually coated between the blue-sensitive and the remaining emulsion layers which are sensitive to blue light, as well as to green and red light. Our invention consists in coating a separate masking emulsion layer between the yellow filter layer and the support, preferably just under the yellow filter layer. When this material is exposed to a color image, no latent image will be formed on the auxiliary layer because it is sensitive to only blue light and blue light is prevented from acting on it because of the yellow screening layer. After exposure in the usual way, the film is developed in a negative developer and colored positive images are then formed by reversal. In the coupling method of forming colored images, in which dyes are formed by coupling a suitable dye intermediate or coupler, which may be present either in the developer or in the emulsion layers, with the oxidation product of an aromatic amino developing agent, the reversal processing is carried out in the following ways. If the couplers are present in the emulsion layers, the reversal development may be accomplished in a single development step. This requires a reversal exposure to blue light from the top and to yellow light from the bottom. The reversal exposure does not affect the auxiliary layer because the yellow screening dye prevents the action of blue light on it and because the yellow light exposure from the bottom has no effect on it. If the layers do not contain coupling compounds, the film may be processed by a method such as that described in our U. S. application Serial No. 185,700, filed January 19, 1938, in which all three layers are subjected to light exposure before reversal development. In this case the top layer is exposed to blue light and the bottom layers are exposed separately to red and green light through the support. In either case the yellow screening material originally present in the film will prevent exposure of the auxiliary layer and lower two image layers, if it is retained through the first developer.

It is not necessary, however, that a screening material be used which is stable to the first developer. It is possible to use a fogged emulsion or an infra-red sensitive emulsion containing a yellow dye which is removed in the first developer. In the case of a fogged emulsion, it will be developed to metallic silver in the first developer, and this metallic silver will prevent action of light on the auxiliary layer and lower emulsion layers upon reversal exposure. Likewise, in the case of an infra-red sensitive emulsion, an infrared exposure prior to first development will render the silver halide of the screening layer developable in the first developer.

In either case the film, after color processing, has three layers each containing negative and positive silver images and positive dye images, the auxiliary layer being unaffected and still being a blue-sensitive silver halide emulsion. The negative and positive silver images are then removed in a suitable bath which will not dissolve silver halide, such as an acid solution of potassium dichromate. This leaves the film with the usual three-color subtractive dye images and the unaffected auxiliary silver halide layer. It is desirable that substantially all of the silver halide in the three principal emulsion layers but used in negative and positive development and that there is little residue left after the action of the silver solvent bath.

The yellow filter layer, if retained through the first development, should consist either of colloidal silver which will be bleached with the silver images, or of a yellow dye which can be oxidized to a colorless compound simultaneously with the silver bleaching. The mask is then printed onto the auxiliary layer by exposure through one or more of the positive dye images and depending upon the blue light absorption of these positive images to form a negative latent image in the auxiliary layer. White light may be used for this exposure, and since the auxiliary layer is sensitive only to blue, this is equivalent to an exposure of blue light which is absorbed in proportion to the blue density of the cyan and magenta dye images. The cyan and magenta dyes theoretically transmit blue light completely but actually absorb a great deal of light in this region of the spectrum and this light absorption can, therefore, be used for printing an image of these dyes. After such exposure the film is developed in a black and white developer of the usual type and fixed in hypo, leaving in the auxiliary layer a negative image corresponding to the degree of undesired blue absorption of the combined cyan and magenta dye images.

Inasmuch as the color processing of film not containing couplers must be done by three reversal printings, it may be advantageous to coat the green-sensitive layer next to the support and the red-sensitive layer upon it. This would permit the second reversal exposure to be made upon the emulsion conveniently near the support in order to obviate the difficulty normally encountered when this second reversal exposure must be made on a much desensitized emulsion through an intervening layer containing heavy negative and positive silver and dye images.

By placing the auxiliary layer elsewhere in the system and making an exposure through other combinations of colored layers, different forms of color correction can be produced. In addition, this procedure may be used to form positive neutral key images. After negative development of the masking image, the silver thus formed may be removed by another silver solvent bath and the residual halide exposed and developed to a positive. By using a color developer to develop the image in the auxiliary layer instead of the black and white developer, a correcting or auxiliary color image can be obtained in this additional layer.

Although our process may be used in any color method in which a multi-layer element is processed so that no image is formed in the masking layer prior to the development of the masking image, our process is especially suitable for use with a method such as that described in our U. S. patent application Serial No. 185,700, filed January 19, 1938. According to the method described in that application, a multi-layer photographic element consisting of three emulsion layers sensitized, respectively, to the red, green and blue regions of the spectrum are coated on one side of a single support. After exposure and negative development of this film, the emulsion layers are selectively exposed and colored images are formed therein. After negative development, the bottom layer is exposed through the support to red light and a blue-green color image developed therein. The top layer is next exposed from the outside to blue light and a yellow positive image developed therein. The middle layer, according to the present process, should be then exposed to green or yellow light and a magenta image developed therein.

According to the present process, the film at this stage, which contains negative and positive silver images and positive dye images, is subjected to a bath which removes the silver images without affecting unexposed silver halide. The masking layer can then be exposed through the cyan and magenta image layers to blue light and developed in a black and white developer. After fixing, this leaves a silver image in the auxiliary layer between the yellow and magenta image layers.

Our method of color correction may also be used in a negative-positive process by originally developing the latent images in all image-forming layers to negative dye and silver. After washing, the residual silver halide in the image-forming layers is exposed to blue light from the outside and to yellow light through the support. A second development in a black-and-white developer forms silver images from the thus-exposed silver halide, and all the silver is then removed in a suitable bleach bath, such as acid potassium dichromate, which does not affect the dyes or the silver halide of the masking layer. This layer is then exposed to blue light through the support as described above, and a positive silver masking image developed in a black-and-white developer.

A specific method of carrying out our process will now be described.

A sensitive element, such as that shown in the first stage of the drawing, consists of a support 10 of transparent material such as glass, cellulose acetate or other organic acid ester or suitable synthetic resin, is coated with emulsion layers 11, 12 and 13 sensitive respectively to the red, green and blue regions of the spectrum. A yellow filter layer 14 of a suitable light absorbing material such as colloidal silver is coated immediately under the blue-sensitive emulsion layer 13. A slow, blue-sensitive emulsion 15 is coated between the yellow filter layer 14 and green-sensitive emulsion layer 12.

After exposure in a camera or in a printer in the usual way, the film is developed in an ordinary black and white developer. If the film has been properly exposed, development for five to ten minutes at 20° C. in a developer of the following composition is satisfactory:

|  | Grams |
|---|---|
| Monomethyl-p-aminophenol sulfate | 6 |
| Hydroquinone | 10 |
| Sodium sulfite | 50 |
| Sodium carbonate | 30 |
| Potassium bromide | 5 |
| Potassium thiocyanate | .5 |
| Water to 1 liter. | |

This development produces negative silver images 16, 17 and 18 in emulsion layers 11, 12 and 13, respectively, and leaves the layers 14 and 15 unaffected.

After washing the film for about five minutes, it is exposed through the base for about twenty seconds to 100 foot candles of light through a red filter transmitting light of wave length longer than 640 millimicrons to expose the bottom layer 11. After exposure in this way, the film is developed for twelve minutes in a color forming developer of the following composition:

*Solution A*

|  | Grams |
|---|---|
| 2-amino-5-diethylamino toluene HCl | 2 |
| Sodium sulfite | 10 |
| Sodium carbonate | 40 |
| Potassium bromide | 4 |
| Potassium thiocyanate | 1 |
| 6-nitrobenzimidazole | 0.1 |
| Water to 950 cc. | |

*Solution B*

| | | |
|---|---|---|
| 2,6-dibromo-1,5-dihydroxynaphthol | grams | 0.8 |
| Sodium hydroxide | do | 5 |
| Water | cc | 50 |

(Solution B is added to Solution A.)

After washing for a few minutes, the film is given a printing exposure for either the top or middle emulsion layer. If the exposure for the top emulsion layer is given first, the film is exposed from the emulsion side for about twenty seconds to approximately 2000 foot candles of blue light to expose the top layer. It is then developed in a yellow color forming developer which may have the following composition:

*Solution A*

|  | Grams |
|---|---|
| 2-amino-5-diethylaminotoluene HCl | 2 |
| Sodium sulfite | 5 |
| Potassium bromide | 1 |
| Sodium carbonate | 20 |
| Sodium sulfate | 50 |
| Water to 990 cc. | |

*Solution B*

| | | |
|---|---|---|
| Benzoyl acetoacetanilide | grams | 2.8 |
| Sodium hydroxide | do | 1 |
| Water | cc | 10 |

(Solution B is added to Solution A.)

After development the film is washed for about five minutes and is then exposed from the support side to green or yellow light of an intensity of from 2000 to 13,000 foot candles for about 20 seconds. It is then developed in a magenta color forming developer which may have the following composition:

*Solution A*

|  | Grams |
|---|---|
| 2-amino-5-diethylaminotoluene HCl | 2 |
| Sodium sulfite | 10 |
| Potassium carbonate | 50 |
| Potassium bromide | 5 |
| 6-nitrobenzimidazole | 0.1 |
| Water to 950 cc. | |

*Solution B*

| | | |
|---|---|---|
| 2-cyanoacetyl coumarone | grams | 2.8 |
| Sodium hydroxide | do | 5 |
| Water | cc | 50 |

(Solution B is added to Solution A.)

The film is washed for five minutes and the negative and positive silver images are then removed in a bath which may have the following composition:

| | | |
|---|---|---|
| Potassium dichromate | grams | 2.5 |
| Sulfuric acid (concentrated) | cc | 2.5 |
| Potassium alum or sodium sulfate | grams | 50 |
| Water to 1 liter. | | |

After the formation of the colored images in this way, the film appears as shown in the third stage of the drawing, having a cyan image 19 in the bottom emulsion layer, a magenta image 20 in the middle emulsion layer and a yellow image 21 in the top emulsion layer. The silver halide in layer 15 has not been affected but the yellow filter material has been removed from the screening layer as shown at 22.

The film is next given an exposure through the support to blue light to print the masking image on the layer 15. This exposure may be given through a blue filter such as Wrattan Filter No. 35 or 36, the intensity being about 4000 foot candle seconds. This exposure should be such that the blue light absorption of the cyan and magenta dyes is just sufficient to prevent exposure of the masking layer where the emulsion layers containing these dyes have dye throughout the depth of the layer.

The film is then developed in a black and white developer of the following composition:

| | Grams |
|---|---|
| Monomethyl-p-aminophenol sulfate | 4 |
| Hydroquinone | 1 |
| Sodium sulfite | 37.5 |
| Sodium carbonate | 25 |
| Potassium bromide | 2.0 |
| Water to 1 liter. | |

After fixing in an ordinary solution of hypo the film appears as shown in the fourth stage of the drawing. The masking layer contains a negative silver image 23 representing the blue light absorption of the cyan and magenta dye image, the unexposed silver halide having been removed from this layer. The film is then ready for use in projection or printing onto suitable color sensitive material.

The blue light absorption of the cyan dye is always proportional to its red absorption, although the actual value of the ratio depends on the wave-length of the blue light. Similarly the ratio of blue absorption to green absorption of the magenta is independent of the dye density but depends on the wave-length of the blue light. The effect of printing through the cyan and magenta images onto the masking layer, is, therefore, to give a silver density which increases as the combined blue absorptions of the cyan and magenta layers decreases. In this way there is obtained an automatic correction for the undesirable absorption of cyan and magenta dyes in the blue region. By using narrow spectral regions for exposing the masking layer, the ratio of masking for the magenta and cyan images may be varied.

The densities of the whites, magentas, yellows and reds of the original will, therefore, be increased most. The densities of the blue-greens, and greens will be increased less and the blues not at all. Consequently the highlight density of the original is increased and the density range and gamma are reduced. There is no alteration in hue of any portion since the negative mask is neutral gray silver. As will be apparent from the drawing, the densities of the various portions are increased and, since the densities of the blue-greens and greens are increased least and the blues not at all, these colors appear relatively more luminous.

Modifications may be made in our process within the scope of the appended claims.

We claim:

1. The method of preparing a multi-color printing element affording corrected color prints, which comprises exposing to an object to be photographed an element having a plurality of superposed emulsion layers sensitive to the primary colors, a yellow filter layer between the blue-sensitive layer and the remaining layers, and a blue-sensitive auxiliary layer behind the yellow filter layer, forming dye and silver images in said layers sensitive to the primary colors by exposure of said layers and color development and forming silver images in the portions of said layers where no dye images are formed, removing the metallic silver thus formed without affecting the dye images and the auxiliary layer, exposing said auxiliary layer through at least the cyan dye image with blue light, and developing a metallic silver image in said auxiliary layer.

2. The method of preparing a multi-color printing element affording corrected color prints, which comprises exposing to an object to be photographed an element having a plurality of superposed emulsion layers sensitive to the primary colors, a yellow filter layer stable to developers between the blue-sensitive layer and the remaining layers, and a blue-sensitive auxiliary layer behind the yellow filter layer, developing silver images in said layers sensitive to the primary colors, forming positive dye and silver images in said layers by reversal exposure of said layers and color development, removing the metallic silver thus formed without affecting the dye images and the auxiliary layers, exposing said auxiliary layer through at least the cyan dye image with blue light, and developing a metallic silver image in said auxiliary layer.

3. The method of preparing a multi-color printing element affording corrected color prints, which comprises exposing to an object to be photographed an element having a plurality of superposed emulsion layers sensitive to the primary colors, a yellow filter layer stable to developers between the blue-sensitive layer and the remaining layers, and a blue-sensitive auxiliary layer behind the yellow filter layer, developing silver images in said layers sensitive to the primary colors, forming positive dye images in said layers by reversal exposure of said layers and color development, removing the metallic silver thus formed without affecting the dye images and the auxiliary layer, exposing said auxiliary layer through the cyan and magenta dye images with blue light, and developing a metallic silver image in said auxiliary layer.

4. The method of preparing a multi-color printing element affording corrected color prints, which comprises exposing to an object to be photographed an element having a plurality of superposed emulsion layers sensitive to the blue, green, and red spectral regions, a yellow filter layer stable to developers between the blue-sensitive layer and the remaining layers, and a blue-sensitive auxiliary layer between the yellow filter layer and the green-sensitive layer, developing silver images in said layers sensitive to the primary colors, forming positive dye images in said layers by reversal exposure of said layers and color development, removing the metallic silver thus formed without affecting the dye images and the auxiliary layer, exposing said auxiliary layer through the cyan and magenta dye images with blue light, and developing a metallic silver image in said auxiliary layer.

LEOPOLD D. MANNES.
LEOPOLD GODOWSKY, Jr.
LOT S. WILDER.